(No Model.)
J. W. DENNIS.
FILLING FOR TEETH.
No. 532,724. Patented Jan. 15, 1895.
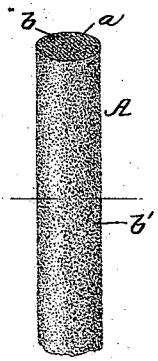
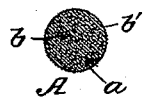
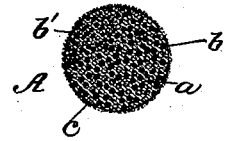
WITNESSES:
INVENTOR
James W. Dennis.
BY
ATTORNEYS.

UNITED STATES PATENT OFFICE.

JAMES W. DENNIS, OF CINCINNATI, OHIO, ASSIGNOR TO CLARA E. DENNIS, OF SAME PLACE.

FILLING FOR TEETH.

SPECIFICATION forming part of Letters Patent No. 532,724, dated January 15, 1895.

Application filed July 6, 1894. Serial No. 516,720. (No specimens.)

*To all whom it may concern:*

Be it known that I, JAMES W. DENNIS, of Cincinnati, in the county of Hamilton and State of Ohio, have invented a new and Improved Prepared Filling for Teeth, of which the following is a full, clear, and exact description.

My invention relates to an improvement in fillings for teeth, and especially to a prepared filling, or a filling that is in stick or block form, and so prepared that particles may be removed and inserted into a cavity of a tooth and seated therein as a basis filling.

Another object of the invention is to provide a filling of the above description that can be used under conditions and in locations where other preparations cannot be effectively applied, and, since germs incident to tooth decay cannot exist or develop in the presence of copper, this filling may be considered as an efficient preventive and arrester of such decay.

A further object of the invention is to provide a filling capable of holding by amalgamation an indestructible cover, casing or wearing surface, meeting all the requirements of mastication, and wherein in cases where a lengthy control of the mouth fluids is impossible, or undesirable, and rapid manipulation is required, the value of the filling will be most apparent, and wherein as a filling for sensitive teeth, not amenable to ordinary treatment, the filling will possess qualities particularly adapting it to such emergencies.

The invention consists in the assembling of certain ingredients, and in their treatment, together with the formation of the completed article.

Reference is had to the accompanying drawings, forming a part of the specification, in which similar letters of reference indicate corresponding parts in all of the figures.

Figure 1 is a perspective view of a portion of a stick of the improved filling and on an enlarged scale. Fig. 2 is a transverse section on line 1—1 of Fig. 1, and Fig. 3 is a transverse section, on an enlarged scale, of a filling containing an additional amalgamating material.

Referring to Figs. 1 and 2 of the drawings A represents the filling composed of gutta percha $a$ and copper $b$, made in stick form and having an outer coating or covering $b'$ of copper.

In preparing the filling, ordinarily an equal amount of gutta percha and copper filings, or copper in a comminuted state is employed, the gutta percha being heated upon a hot slab, or in any approved manner, and when the gutta percha is sufficiently pliable the copper is added, and kneaded or otherwise worked into the plastic gutta percha, the gutta percha being adapted to receive as much copper as possible. The mass thus formed is now rolled preferably between two heated slabs, or is otherwise manipulated to render it in stick form as shown, or it may be placed in molds and given any other desired shape. While the mass is still in a heated condition, its outer surface is rolled in comminuted copper, receiving as much as possible so as to form an outer coating for the same. The sticks or blocks are now allowed to cool, and are then ready for use for filling purposes, or as a commercial commodity.

Frequently it may be desirable to add zinc filings, or zinc in a comminuted state, to the gutta percha and copper, especially where a quick amalgamation with a metallic cover, facing or wearing surface, or finished filling is desirable. In such instances the zinc is added in about two parts of zinc to about ten parts of the combined copper and gutta percha. This form of filling is shown in Fig. 3, wherein $c$ represents the zinc. In other respects the stick or prepared filling is the same as that shown in Figs. 1 and 2.

In the filling of a tooth, the stick filling is broken or reduced to small fragments, and the said fragments are introduced into the cavity and pressed to place to form the basis filling, or filling in part. This filling, under proper conditions, will adhere tenaciously to the wall of the cavity; and should the cavity be moist the filling will not deteriorate; and after the basis filling has been placed in position, gold filings, or gold in a comminuted state is pressed or otherwise worked into the upper surface to form an amalgamating surface for the metallic cover, facing or wearing surface, finishing the filling and forming an indestructible filling, meeting all the requirements of mastication.

This filling is especially applicable to the filling of cavities in teeth for example that are but partially developed, and that cannot be filled conveniently by other known methods, or wherein a quick or temporary filling is required. When the filling is to be a very temporary one the basis filling may be simply covered by a thin coating of amalgam.

A filling prepared in the manner above set forth is exceedingly convenient, it is always at hand and is in a shape rendering it exceedingly adaptable for the purpose and convenient of manipulation. Furthermore, it economizes in time, since the filling is fully prepared when placed upon the market.

I do not claim broadly in this application, combining copper with any plastic filling material, as the same is claimed in another pending application.

Having thus described my invention, I claim as new and desire to secure by Letters Patent—

1. A prepared filling, the same comprising copper and gutta percha, substantially as shown and described.

2. A filling for teeth, the same consisting of copper, gutta percha and zinc in substantially the proportions set forth.

3. A filling for teeth, comprising gutta percha and copper formed into a stick, having an outer coating of copper thereon, substantially as described.

JAMES W. DENNIS.

Witnesses:
J. FRED. ACKER,
C. SEDGWICK.